United States Patent
Adachi et al.

(10) Patent No.: US 9,544,791 B2
(45) Date of Patent: Jan. 10, 2017

(54) SATELLITE COMMUNICATION DEVICE AND SATELLITE COMMUNICATION SYSTEM

(71) Applicant: Furuno Electric Co., Ltd., Nishinomiya (JP)

(72) Inventors: Satoshi Adachi, Nishinomiya (JP); Shinji Tamura, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 399 days.

(21) Appl. No.: 14/137,704

(22) Filed: Dec. 20, 2013

(65) Prior Publication Data
US 2014/0185460 A1  Jul. 3, 2014

(30) Foreign Application Priority Data
Dec. 27, 2012  (JP) ................. 2012-285735

(51) Int. Cl.
| | |
|---|---|
| H04L 12/26 | (2006.01) |
| H04L 29/06 | (2006.01) |
| H04L 12/56 | (2006.01) |
| H04L 12/28 | (2006.01) |
| H04L 12/24 | (2006.01) |
| H04W 24/08 | (2009.01) |
| H04B 7/185 | (2006.01) |

(52) U.S. Cl.
CPC ......... *H04W 24/08* (2013.01); *H04B 7/18508* (2013.01); *H04B 7/18528* (2013.01)

(58) Field of Classification Search
CPC ...... H04L 43/0811; H04L 43/10; H04W 12/06
USPC ................. 370/316, 246, 278, 282
See application file for complete search history.

(56) References Cited

U.S. PATENT DOCUMENTS

| | | | |
|---|---|---|---|
| 6,353,779 B1 | 3/2002 | Simon et al. | |
| 7,400,857 B2 * | 7/2008 | Chang .................. | H01Q 1/007 455/12.1 |

(Continued)

FOREIGN PATENT DOCUMENTS

JP  2006527926 A  12/2006

OTHER PUBLICATIONS

European Patent Office, Extended European Search Report Issued in Application No. 13198680.4, Feb. 4, 2015, Netherlands, 7 pages.

*Primary Examiner* — Wutchung Chu
(74) *Attorney, Agent, or Firm* — Alleman Hall McCoy Russell & Tuttle LLP

(57) ABSTRACT

A satellite communication device is provided. The satellite communication device includes a determiner for determining availability of communication from a terminal to a WAN based on determination information acquirable from either one of communication via a LAN and the device itself without performing communication via the WAN, and for generating, when the communication from the terminal to the WAN is available, a communicable signal indicating the communication to the WAN being available. The satellite communication device also includes a notifier for receiving, from the terminal, a communication checking signal for requesting to check the availability of the communication to the WAN, and transmitting, when the communication from the terminal to the WAN is available, the communicable signal to the terminal.

12 Claims, 5 Drawing Sheets

(56) References Cited

U.S. PATENT DOCUMENTS

| | | | | |
|---|---|---|---|---|
| 8,687,493 B2* | 4/2014 | Torres | H04B 7/18584 |
| | | | 370/235 |
| 8,868,028 B1* | 10/2014 | Kaltsukis | H04W 4/028 |
| | | | 455/404.1 |
| 2001/0036161 A1* | 11/2001 | Eidenschink | H04B 7/18584 |
| | | | 370/316 |
| 2001/0043573 A1* | 11/2001 | Kelly | H01Q 1/1257 |
| | | | 370/316 |
| 2002/0072332 A1* | 6/2002 | Chang | H01Q 1/007 |
| | | | 455/430 |
| 2003/0031141 A1* | 2/2003 | Schweinhart | H04B 7/18584 |
| | | | 370/316 |
| 2003/0123481 A1* | 7/2003 | Neale | H04B 7/18582 |
| | | | 370/466 |
| 2003/0131079 A1* | 7/2003 | Neale | H04B 7/18582 |
| | | | 709/220 |
| 2003/0139135 A1 | 7/2003 | Rossi | |
| 2005/0136917 A1 | 6/2005 | Taylor | |
| 2008/0170536 A1* | 7/2008 | Marshack | H04B 7/18521 |
| | | | 370/316 |
| 2010/0226428 A1* | 9/2010 | Thevathasan | H04L 65/605 |
| | | | 375/240.02 |
| 2012/0309416 A1* | 12/2012 | Whelan | G01S 5/0205 |
| | | | 455/456.1 |
| 2013/0051249 A1* | 2/2013 | Bartlett | H04L 43/0811 |
| | | | 370/246 |

* cited by examiner

| AUTHORIZATION INFORMATION | |
|---|---|
| TERMINAL | AUTHORIZATION/ UNAUTHORIZATION |
| AA:BB:CC:DD:EE:FF | AUTHORIZED |
| BB:CC:DD:EE:FF:01 | AUTHORIZED |
| CC:DD:EE:FF:01:02 | UNAUTHORIZED |

FIG. 2B

| AUTHORIZATION INFORMATION | |
|---|---|
| TERMINAL | AUTHORIZATION/ UNAUTHORIZATION |
| 192.168.1.10 | AUTHORIZED |
| 192.168.1.11 | AUTHORIZED |
| 192.168.1.15 | UNAUTHORIZED |

FIG. 2A

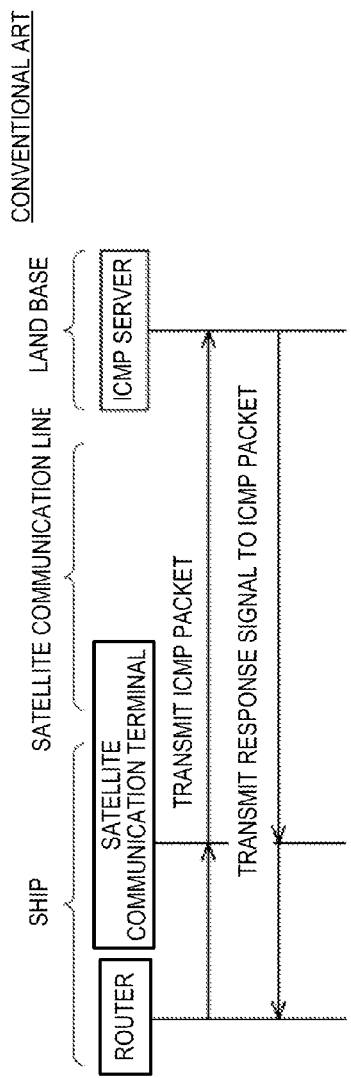
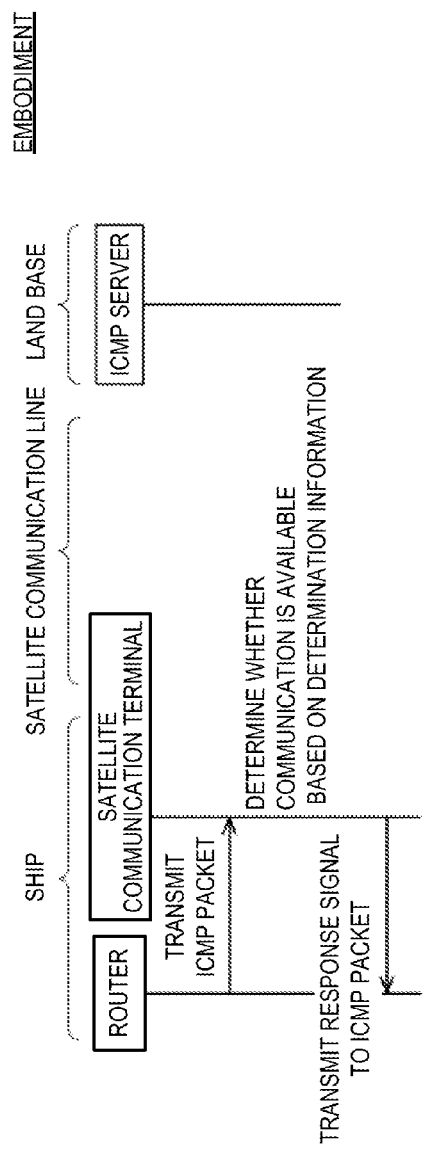
FIG. 3A
FIG. 3B

SATELLITE COMMUNICATION DEVICE AND SATELLITE COMMUNICATION SYSTEM

CROSS-REFERENCE TO RELATED APPLICATION(S)

This application claims priority under 35 U.S.C. §119 to Japanese Patent Application No. 2012-285735, which was filed on Dec. 27, 2012, the entire disclosure of which is hereby incorporated by reference.

TECHNICAL FIELD

The present invention generally relates to a satellite communication device for performing communication via an artificial satellite.

BACKGROUND OF THE INVENTION

Conventionally, a technique for performing communication with, for example, a telephone, a facsimile, and internet, via an artificial satellite has been known. Communication via an artificial satellite (satellite communication) is used in an area (sea, a remote island, etc.) where neither of wired communication facilities nor wireless communication facilities are equipped. JP2006-527926A discloses a technique which is used when utilizing satellite communication in aircrafts, etc.

In JP2006-527926A, the technique enabling telephone conversation and communication in aircrafts via mobile phones is disclosed. Specifically, an aircraft has an antenna for satellite communication. The satellite communication connects a network for mobile phones inside the aircraft with a network for a base station on the ground. Thus, telephone conversation and communication are also available in the aircraft by using mobile phones.

Meanwhile, for satellite communication, a measured rate system in which the fee is determined based on a communication volume, airtime or the like is adopted. In this case, if the satellite communication is always available, the communication fee becomes high. Therefore, in JP2006-527926A, a configuration using an emulator is disclosed.

Even when the network for mobile phones is not connected to the network for the base station, the emulator can operate as if they are connected to each other. Thus, when neither of the telephone conversation nor the communication is performed using the mobile phones, or when the information that neither of the telephone conversation nor the communication is performed is not required to be transferred to the ground, the communication fee can be reduced by disabling the satellite communication.

Meanwhile, a protocol referred to as an ICMP (Internet Control Message Protocol) has been known conventionally. The ICMP is a protocol for notifying to a source host, information and the like regarding an error caused before a packet reached a destination, or the communication regarding the packet. Note that, hereinafter, a server which supports (respondable to) packets using the ICMP is referred to as an ICMP server.

As communication using the ICMP, a ping is known, for example. The ping utilizes an echo request and an echo notification of the ICMP. The ping transmits an ICMP packet to other terminal and ICMP server and the like with which network communication is desired to be checked, and checks whether the packet arrives appropriately based on whether a response to the ICMP packet is received. By utilizing the ping, for example, it can be monitored whether the line to the ICMP server is alive.

Here, in failover systems (a collective term of systems where one of the systems cannot be used, another one of the systems is used), in order to grasp a line status in a simple method, normally, the life-and-death monitoring of the main line is performed using the ICMP packet. However, in this case, if the measured rate system is adopted to the main line, a communication fee will be charged.

Note that, as long as the method of checking either one of the availability of the communication and the communication environment by actually performing satellite communication is adopted, methods other than the ping also have this disadvantage.

SUMMARY OF THE INVENTION

The present invention is made in view of the above situations, and mainly aims to provide a satellite communication device for preventing a communication fee from being charged, by checking either one of availability of communication and a communication environment.

One aspect of the present invention provides a satellite communication device. The satellite communication device transceives information with a terminal connected to a LAN, transmits the information received from the terminal to a WAN, via a satellite by a wireless signal, and receives information from the WAN via the satellite by a wireless signal. The satellite communication device includes a determiner and a notifier. The determiner determines availability of communication from the terminal to the WAN based on determination information that is acquirable from either one of communication via the LAN and the device itself without performing communication via the WAN, and the determiner generates, when the communication from the terminal to the WAN is available, a communicable signal indicating that the communication to the WAN is available. The notifier receives, from the terminal, a communication checking signal for requesting to check the availability of the communication to the WAN, and transmits, when the communication from the terminal to the WAN is available, the communicable signal to the terminal transmitted the communication checking signal.

Thus, the availability of the communication of the terminal can be determined without actually performing the communication. Therefore, in the case where the contracted satellite communication is based on a measured rate system, a communication fee can be reduced.

The satellite communication device may also include a detector for detecting a signal level of the wireless signal transmitted from the satellite, the detected signal level being utilized as the determination information.

Thus, for example, when the signal level is lower than a predetermined level, it is determined that the satellite communication cannot be performed appropriately. Therefore, the availability of the communication can be determined based on the information.

A connection state of a satellite communication line to the WAN may be utilized as the determination information.

For example, when the connection state of the satellite communication line is offline, obviously the satellite communication cannot be performed. Therefore, the availability of the communication can be determined based on the information.

When the communication checking signal from the terminal is received, the determiner may determine whether the communication from the terminal to the WAN is available.

Thus, the availability of the communication to the WAN can be determined based on latest information. Therefore, an accurate determination can be performed.

Each of the communication checking signal and the communicable signal may be comprised of a packet using an ICMP.

As described above, a general protocol is used to, for example, notify the information regarding the communication. Therefore, the present invention can be realized without particular setting to the terminal.

The communication checking signal may be transmitted in response to a ping command. The communicable signal may be a response signal to the communication checking signal.

Thus, by using the ping often used in normal network processing, the availability of the communication of the terminal can be determined. Moreover, since the terminal only performs a normal ping transmission, the present invention can be realized without particular setting to the terminal.

Setting of authorization/unauthorization of the communication of the terminal may be utilized as the determination information.

Thus, since the satellite communication cannot be performed when the communication of the terminal is unauthorized, the availability of the communication can be determined based on the information.

Information in which one of an IP address and an MAC address of the terminal is associated with the authorization/unauthorization of the communication of the terminal may be utilized as the determination information.

Thus, the terminal can be identified by using one of the IP address and the MAC address. Therefore, when a plurality of terminal exist, the authorization/unauthorization of the communication can be set for each terminal.

Another aspect of the present invention provides a satellite communication system. The satellite communication system includes a terminal and a satellite communication device. The terminal performs one of processing using satellite communication and processing regarding the satellite communication. The satellite communication device includes a determiner and a notifier. The determiner determines availability of communication from the terminal to a WAN based on determination information that is acquirable from either one of communication via a LAN and the device itself without performing communication via the WAN, and generates, when the communication from the terminal to the WAN is available, a communicable signal indicating that the communication to the WAN is available. The notifier receives, from the terminal, a communication checking signal for requesting to check the availability of the communication to the WAN, and transmits, when the communication from the terminal to the WAN is available, the communicable signal to the terminal transmitted the communication checking signal. The terminal performs different processing depending on whether the communicable signal is transmitted from the notifier.

Thus, the availability of the communication of the terminal can be determined without actually performing the communication. Therefore, in the case where the contracted satellite communication is based on a measured rate system, the communication fee can be reduced.

The satellite communication device may include a plurality of satellite communication devices. The terminal may be able to select a satellite communication device to perform the satellite communication from the plurality of satellite communication devices. When the communicable signal is not transmitted after the communication checking signal is transmitted to the satellite communication device in use, the terminal may perform the satellite communication by using a different satellite communication device.

Thus, when a certain satellite communication device is utilized and it cannot be connected to the WAN, a different satellite communication device can be utilized automatically. Note that, since the availability of the connection to the WAN can be determined without actually performing the satellite communication in the present invention, even when the communication checking is often performed, increase of the communication fee can be prevented.

Further another aspect of the present invention provides a satellite communication method of connecting a terminal to a WAN via satellite communication by a wireless signal. The satellite communication method includes determining availability of communication from the terminal to the WAN based on determination information that is acquirable from either one of communication via a LAN and a device itself (a device for determining the availability) without performing communication via the WAN. The satellite communication method also includes receiving, from the terminal, a communication checking signal for requesting to check the availability of the communication to the WAN, and transmitting, when the communication from the terminal to the WAN is available, the communicable signal to the terminal transmitted the communication checking signal.

Thus, the availability of the communication of the terminal can be determined without actually performing the communication. Therefore, in the case where the contracted satellite communication is based on a measured rate system, the communication fee can be reduced.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 2A and 2B are views illustrating examples of authorization information, respectively;

FIGS. 3A and 3B are sequence diagrams illustrating flows of a ping in satellite communication systems of a conventional art and one embodiment, respectively;

DETAILED DESCRIPTION

Figure 1:
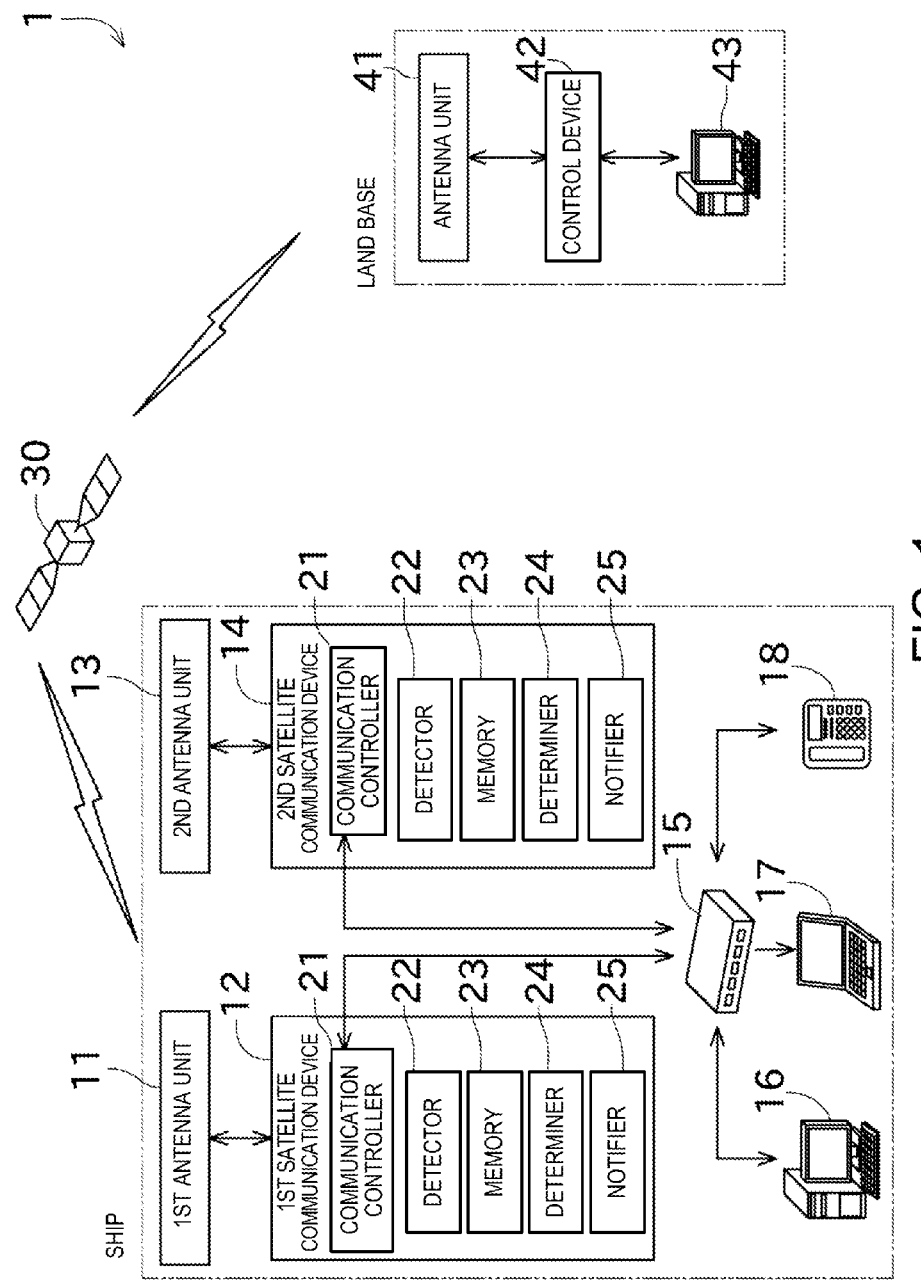
FIG. 1 is a block diagram of a satellite communication system for performing satellite communication between a ship and a land base.

Next, one embodiment of the present invention is described with reference to the accompanying drawings. FIG. 1 is a block diagram of a satellite communication system 1 for performing satellite communication between a ship and a land base.

As illustrated in FIG. 1, in a case of performing communication between a ship and a land base (e.g., a building), communication via an artificial satellite 30 (satellite communication) may be performed. Note that, although only one artificial satellite 30 is illustrated in FIG. 1, in fact, a plurality of artificial satellites exist and an appropriate artificial satellite is selected according to a position of the ship and a communication service to be used.

Moreover, in this embodiment, two satellite communication devices are provided in the ship, the communication is performed using one of the satellite communication devices according to the situation. The satellite communications performed by the satellite communication devices are respectively provided by different providers where used artificial satellites, communication service areas, and communication fees are different. Note that, the number of the satellite communication devices is not limited to two, but may be three or more.

Here, the configuration of the satellite communication system 1 is described in detail. On the ship side, as a configuration for performing the satellite communication, the satellite communication system 1 includes a first antenna unit 11, a first satellite communication device 12, a second antenna unit 13, and a second satellite communication device 14.

The first antenna unit 11 transmits a radio wave to the artificial satellite 30, and receives a radio wave from the artificial satellite 30. Moreover, the first antenna unit 11 can change an elevation angle and an azimuth of an antenna thereof and, thus, it can orient the antenna to the artificial satellite 30. Note that, in a case where the first antenna unit 11 includes a non-directional antenna, the mechanism for changing the elevation angle and the azimuth is not required.

The first satellite communication device 12 receives information from terminals (e.g., a router 15, PCs 16 and 17, and a telephone equipment 18 described later) connected to the same LAN. Moreover, the first satellite communication device 12 uses the radio wave (wireless signal) transmitted from the first antenna unit 11 to transmit the information received from these terminals to a WAN (Wide Area Network) and transmit information received from the WAN to the relevant terminal(s). Further, the first satellite communication device 12 includes an interface for various applications, such as an NMEA and a LAN.

The second antenna unit 13 transceives a radio wave with the artificial satellite 30 which is different from the one artificial satellite used by the first antenna unit 11. The second antenna unit 13 can, similarly to the first antenna unit 11, change an elevation angle and an azimuth of an antenna thereof and, thus, it can orient the antenna to the artificial satellite 30. Note that, in a case where the second antenna unit 13 includes a non-directional antenna, the mechanism for changing the elevation angle and the azimuth is not required.

The second satellite communication device 14 uses the radio wave transceived by the second antenna unit 13 to perform the satellite communication. Note that, the first and second satellite communication devices 12 and 14 have similar internal configurations, except that the used artificial satellites 30 are different.

Moreover, the ship is provided with the router 15, the PCs 16 and 17, and the telephone equipment 18.

The router 15 is connected with the first and second satellite communication devices 12 and 14, and is also connected with the PCs 16 and 17 and the telephone equipment 18. Thus, a LAN (Local Area Network) is formed in the ship. Moreover, the router 15 connects the PCs 16 and 17, and the telephone equipment 18 to internet via the satellite communication devices. Note that, the router 15 can choose either one of the first and second satellite communication devices 12 and 14 to communicate. The control of performing this selection is described later.

Since the PCs 16 and 17 and the telephone equipment 18 are connected to the internet by the router 15, they can realize transception of data and telephone conversation (including telephone conversation using VoIP).

Moreover, the land base is, similarly to the ship, equipped with an antenna unit 41 for transceiving the radio wave with the artificial satellite 30, a control device 42 for controlling the antenna unit 41, and a PC 43.

Note that, the antenna unit 41 and the control device 42 are not necessarily equipped near the PC 43. For example, it may be such that the data transmitted from the PC 43 is transmitted to a different location via internet, and the data is transmitted to the satellite via an antenna unit or the like equipped at the location.

The satellite communication can be realized by the above configuration. Therefore, an operator at the location can transceive predetermined data with the PCs 16 and 17 by utilizing the PC 43.

Next, the first and second satellite communication devices 12 and 14 are described in detail. Note that, since the first and second satellite communication devices 12 and 14 have the similar configurations as described above, hereinafter, the description is given about the first satellite communication device 12 to represent the two satellite communication devices.

As illustrated in FIG. 1, the first satellite communication device 12 includes a communication controller 21, a detector 22, a memory 23, a determiner 24, and a notifier 25.

The communication controller 21, for example, analyzes the radio wave transceived by the first antenna unit 11 and performs the satellite communication. Note that, the communication controller 21 stores, in the memory 23, a current connection state (online/offline) of a satellite communication line. Specifically, when the first satellite communication device 12 is activated, the communication controller 21 connects the satellite communication line to change the connection state "online" Then, when the satellite communication line is disconnected due to, for example, failure of the wireless signal, the connection state becomes "offline."

The detector 22 detects a signal level of the radio wave received by the first antenna unit 11.

The memory 23 stores information indicating authorization regarding communication (authorization information). Since a measured rate system is adopted to the satellite communication in many cases as described above, the communication is restricted in some cases. In this embodiment, the communication is restricted according to the terminals configuring the LAN inside the ship.

FIGS. 2A and 2B illustrate examples of the authorization information stored in the memory 23, respectively. In FIG. 2A, (local) IP addresses of the terminals are used to identify the respective terminals. Further, in the same row as the IP address, the description is given about whether the communication is authorized to the relevant terminal. Moreover, in FIG. 2B, the respective terminals are identified by using MAC addresses of the terminals. Note that, each terminal may be identified by other than the IP address and the MAC address.

Moreover, the authorization/unauthorization of the communication may be determined for each user instead of each terminal. In this case, a user ID is set, and when starting the communication using the terminal, the user is required to input the user ID and, if necessary, a password. Then when the communication is authorized to the user ID, the communication is started. Moreover, the authorization/unauthorization of the communication may be determined according to the application used by the terminal instead of the user and the terminal itself.

The determiner 24 determines whether a predetermined terminal is connectable to internet (whether it is connectable to the WAN via the satellite). The determiner 24 performs the determination based on the signal level detected by the detector 22 and the information stored in the memory 23. Note that, the information which is for determining whether the satellite communication is authorized and which can be acquired from either one of the communication via the LAN and the first satellite communication device 12 without performing the communication via the WAN is hereinafter referred to as "the determination information." Moreover, the determiner 24 can generate a communicable signal indicating that the relevant terminal can be connected to the WAN.

Although various information can be used as the determination information, in this embodiment, the following three kinds of items are used as the determination information: (1) the signal level of the radio wave received from the artificial satellite 30; (2) the connection state of the satellite communication line; and (3) the authorization regarding the communication. Predetermined criteria are provided to the three items, respectively, and when the criteria of all the three items are satisfied, the determiner 24 determines that "the terminal is connectable to internet."

"The signal level of the radio wave received from the artificial satellite 30" is detected by the detector 22 as described above. In this embodiment, a threshold is determined based on, for example, a standard, and when the signal level higher than the threshold is detected, the criterion of this item is determined to be satisfied.

"The connection state of the satellite communication line" is stored in the memory 23 by the communication controller 21. When the satellite communication line is online, the criterion of this item is determined to be satisfied.

"The authorization regarding the satellite communication" can be determined by checking the stored contents in the memory 23. Specifically, the authorization information stored in the memory 23 is compared with either one of the IP address and the MAC address of the terminal to be determined, so as to check the authorization/unauthorization of the communication of the relevant terminal. When the communication is authorized to the relevant terminal, the criterion of this item is determined to be satisfied. Note that, in a case where the authorization/unauthorization of the communication is set for each user, the authorization/unauthorization can be determined by performing the same processing based on, for example, the user ID inputted by the user.

The determiner 24 determines whether the criteria of the items described above are satisfied, and when the criteria of all the items are satisfied, the determiner 24 determines that the relevant terminal is communicable and generates the communicable signal.

The notifier 25 performs notification to the terminal determined by the determiner 24 as communicable. For example, when a certain terminal executes a ping command and transmits an ICMP packet (communication checking signal), the notifier 25 notifies a response to the ICMP packet. The notifier transmits, for example, the communicable signal generated by the determiner 24 to the relevant terminal.

Next, an actual flow of processing of determining whether the communication is available and performing the notification is described. FIGS. 3A and 3B are sequence diagrams illustrating flows of the ICMP packet in satellite communication systems of a conventional art and this embodiment, respectively.

Hereinafter, a case where the router 15 transmits the ICMP packet to a predetermined ICMP server on the ground is considered. Note that, also a case where, instead of the router 15, for example, either one of the PCs 16 and 17 transmits the ICMP packet via the router 15 is similar.

First, the flow in the conventional art is described with reference to FIG. 3A. The ICMP packet (communication checking signal) transmitted due to the ping command executed by the router 15 is transmitted to the first satellite communication device 12. Then, the ICMP packet is transmitted to the ICMP server on the ground via the artificial satellite 30.

When the ICMP server receives the ICMP packet, it transmits a response signal for the ICMP packet to the router 15. Similarly to the transmission of the ICMP packet, the response signal is transmitted to the router 15 via the artificial satellite 30 and the first satellite communication device 12. Thus, the router 15 can grasp, for example, that it can connect the internet by using the first satellite communication device 12, and a time length required for the communication with the ICMP server.

However, in a case where the contracted satellite communication is the measured rate system, the communication fee is also charged for the transception of the ICMP packet.

In this regard, in this embodiment, as illustrated in FIG. 3B, when the first satellite communication device 12 (determiner 24) receives the ICMP packet (communication checking signal), it determines whether the communication of the relevant terminal is available based on the determination information. When the first satellite communication device 12 determines that the criteria of all the three items of the determination information are satisfied, that is, the communication is available, it transmits the response signal (communicable signal) for the ICMP packet to the router 15.

As described above, it can be said that the first satellite communication device 12 functions as a pseudo ICMP server. Note that, in this embodiment, the first satellite communication device 12 responds to the ICMP packet only when the communication is available so that the first satellite communication device 12 behaves the same as the ICMP server; however, an incommunicable signal may also be transmitted to the terminal when the communication is not available.

Thus, the ICMP is supported without actually performing the communication (i.e., without causing a communication fee).

Figure 4:
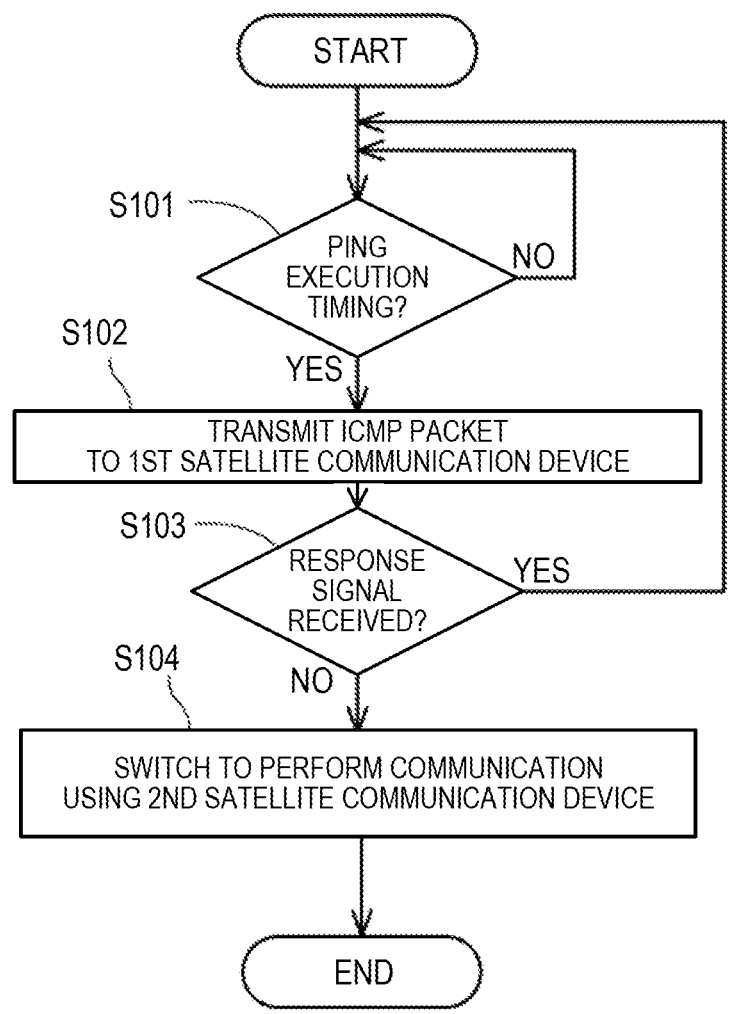
FIG. 4 is a flowchart illustrating one example of processing which is performed by a router to select a satellite communication device to be used.

In this embodiment, the ship is provided with the two satellite communication devices. The first satellite communication device 12 functions as a main device, and the ship normally uses the first satellite communication device 12 to perform the communication. On the other hand, when the communication cannot be performed with the first satellite communication device 12, the communication is performed using the second satellite communication device 14 which functions as a backup device. Hereinafter, the processing that is performed by the router 15 to achieve the processing of selecting the satellite communication device to be used is described. FIG. 4 is a flowchart illustrating one example of processing which is performed by the router to select the satellite communication device to be used.

The router 15 transmits the ICMP packet (communication checking signal) periodically so as to check whether the communication can be performed by the first satellite communication device 12. Specifically, at a timing to execute the ping command (S101), the router 15 transmits the ICMP packet to the first satellite communication device 12 (S102). As the first satellite communication device 12 receives the ICMP packet, it determines whether the communication by the router 15 is available as described above.

If the first satellite communication device 12 responds to the ICMP packet (S103: YES), the router 15 determines that the communication by the first satellite communication device 12 is available, and the processing returns to S101. On the other hand, if the first satellite communication device 12 does not respond to the ICMP packet (S103: NO), the router 15 switches the setting to perform the communication using the second satellite communication device 14 (S104).

By performing the processing as described above, the availability of the communication is determined without actually performing the communication, and the communication can be performed while switching the satellite communication device based on the determination result.

Note that, the flowchart described above is merely an example, and the processing can be, for example, added with other processing and/or changed. For example, it may be such that the router 15 periodically transmits pings to both of the satellite communication devices, and determines the satellite communication device to be used based on the result of ping transmissions.

Moreover, the router 15 may perform processing below. Specifically, in the flowchart in FIG. 4, when the response is not received at S103, the setting is instantly switched such that the second satellite communication device 14 is used to perform the communication; however, the switching may be performed after the communication by the second satellite communication device 14 is confirmed to be available.

Figure 5:
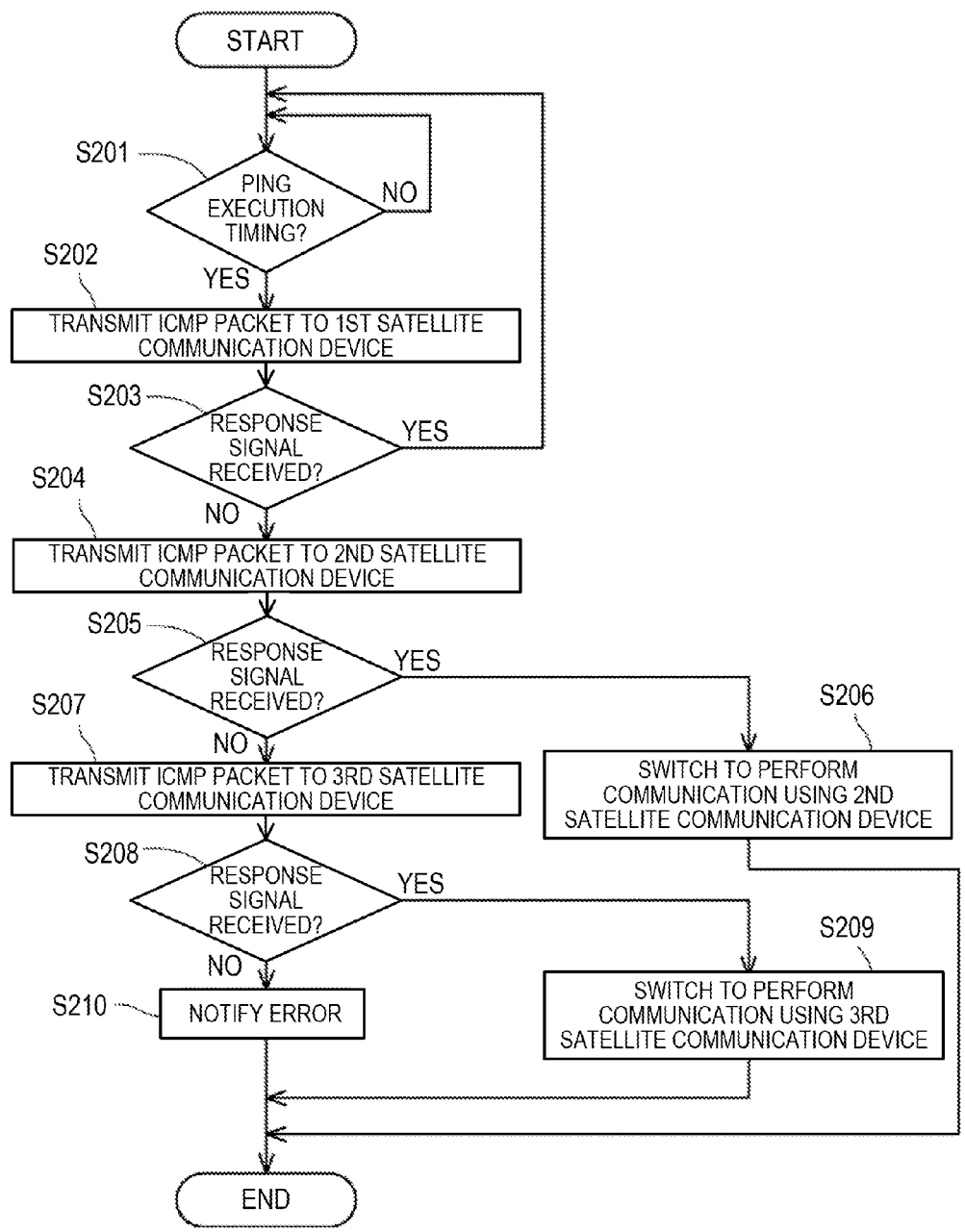
FIG. 5 is a flowchart illustrating another example of processing which is performed by the router to select the satellite communication device to be used.

Hereinafter, a flowchart of the processing performed in a satellite communication system including three satellite communication devices is described. FIG. 5 is a flowchart illustrating another example of processing which is performed by the router to select the satellite communication device to be used. The processing from 5201 to 5203 in FIG. 5 is the same as the processing from S101 to S103 in FIG. 4. However, in FIG. 5, when the router does not receive the response signal from the first satellite communication device, it transmits an ICMP packet to the second satellite communication device (S204) to determine whether the communication is available. Moreover, when the router does not receive the response signal from the second satellite communication device, it transmits an ICMP packet to the third satellite communication device (S207) to determine whether the communication is available. Moreover, in FIG. 5, when the communication is not available by any of the satellite communication devices (in this embodiment, three satellite communication devices), the router notifies an error (S210).

Moreover, although the ping is described above as an example of a method of determining whether the communication is available; the present invention may be applied to other kinds of communication using the ICMP. For example, although a message indicating that the terminal point is unreachable may be transmitted as the ICMP packet, in a case where an unreachable error factor can be identified on the satellite communication device side, the message can be transmitted along with the error factor. Thus, the present invention supports various kinds of communication without introducing dedicated software in the terminal. Note that, the present invention can also be applied to a configuration in which dedicated software is introduced in the terminal and, for example, the availability of the communication is always displayed on a display of a PC.

Moreover, the configuration of the present invention in which the availability of the connection is determined can be utilized in various applications in addition to the switching of the satellite communication device to be used. For example, when the processing utilizing the satellite communication by using the PC 16 is performed and an error occurs, by determining the availability of the connection to the internet by the method of the present invention, it can be checked whether the cause of the error is the network, without causing a communication fee.

As described above, the first satellite communication device 12 includes the determiner 24 and the notifier 25. The determiner 24 determines whether the terminals connected to the same LAN can be connected to the WAN via the artificial satellite 30 based on the information which is for determining whether the satellite communication is available and which can be acquired from either one of the communication via the LAN and the first satellite communication device 12 without performing the communication via the WAN. When the determiner 24 determines to be connectable to the WAN, the notifier 25 performs the notification to the relevant terminal.

Thus, the availability of the communication in the relevant terminal can be determined without actually performing the communication. Therefore, in the case where the contracted satellite communication is the measured rate system, the communication fee can be reduced.

Although the preferred embodiment of the present invention is described above, the above configuration may be modified as follows, for example.

In the above embodiment, the three kinds of information is described as the determination information; however, other kinds of information may be used as the determination information.

In the above description, the satellite communication device including the communication controller 21, the memory 23, the determiner 24, and the notifier 25 in a single housing is disclosed; however, the respective components may be disposed to be physically separated from each other (via a LAN cable, etc.). For example, a configuration of storing the stored contents of the memory 23 in a different PC and referring to them as needed may be considered. In this case, the satellite communication device and the PC correspond to "the satellite communication device" in the above embodiment as a whole.

In the above description, the configuration for performing the communication between the ship and the ground is described; however, as long as the communication is performed via an artificial satellite, it can be applied to various applications, such as cases of communicating between ships, between an aircraft and a land base, and between a remote island and a land base.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A satellite communication device for transceiving information with a terminal connected to a LAN, transmitting the information received from the terminal to a WAN, via a satellite by a wireless signal, and receiving information from the WAN via the satellite by a wireless signal, comprising a processor, the processor comprising:
   a determiner configured to determine availability of communication via satellite by wireless signal from the terminal to the WAN based on determination information that is acquirable from either one of communication via the LAN and the device itself without performing communication via the WAN via satellite by wireless signal, and for generating, when the communication from the terminal to the WAN is available via satellite by wireless signal, a communicable signal indicating that the communication to the WAN is available; and
   a notifier configured to receive, from the terminal, a communication checking signal for requesting to check the availability of the communication to the WAN via satellite by wireless signal, and transmitting without performing communication via the WAN via satellite by wireless signal, only when the communication from the terminal to the WAN is available via satellite by wireless signal, the communicable signal to the terminal in response to the communication checking signal.

2. The satellite communication device of claim 1, further comprising a detector for detecting a signal level of the wireless signal transmitted from the satellite, the detected signal level being utilized as the determination information.

3. The satellite communication device of claim 1, wherein a connection state of a satellite communication line to the WAN is utilized as the determination information.

4. The satellite communication device of claim 1, wherein when the communication checking signal from the terminal is received, the determiner determines whether the communication from the terminal to the WAN is available.

5. The satellite communication device of claim 1, wherein each of the communication checking signal and the communicable signal is comprised of a packet using an ICMP.

6. The satellite communication device of claim 5, wherein the communication checking signal is transmitted in response to a ping command, and the communicable signal is a response signal to the communication checking signal.

7. The satellite communication device of claim 1, wherein setting of authorization/unauthorization of the communication of the terminal is utilized as the determination information.

8. The satellite communication device of claim 7, wherein information in which one of an IP address and an MAC address of the terminal is associated with the authorization/unauthorization of the communication of the terminal is utilized as the determination information.

9. A satellite communication system, comprising:
   a terminal for performing one of processing using satellite communication and processing regarding the satellite communication; and
   a satellite communication device,
   wherein the satellite communication device includes a processor configured to execute:
      a determiner configured to determine availability of communication via satellite by wireless signal from the terminal to a WAN based on determination information that is acquirable from either one of communication via a LAN and the device itself without performing communication via the WAN via satellite by wireless signal, and for generating, when the communication from the terminal to the WAN is available via satellite by wireless signal, a communicable signal indicating that the communication to the WAN is available; and
      a notifier configured to receive, from the terminal, a communication checking signal for requesting to check the availability of the communication to the WAN via satellite by wireless signal, and transmitting without performing communication via the WAN via satellite by wireless signal, only when the communication from the terminal to the WAN is available via satellite by wireless signal, the communicable signal to the terminal in response to the communication checking signal.

10. The satellite communication system of claim 9, wherein the satellite communication device includes a plurality of satellite communication devices,
   wherein the terminal is able to select a satellite communication device to perform the satellite communication from the plurality of satellite communication devices, and
   wherein when the communicable signal is not transmitted after the communication checking signal is transmitted to the satellite communication device in use, the terminal performs the satellite communication by using a different satellite communication device.

11. A satellite communication method of connecting a terminal to a WAN via satellite communication by a wireless signal, comprising:
   determining availability of communication via satellite by wireless signal from the terminal to the WAN based on determination information that is acquirable from either one of communication via a LAN and a device itself without performing communication via the WAN via satellite by wireless signal, and for generating, when the communication from the terminal to the WAN is available via satellite by wireless signal, a communicable signal indicating that the communication to the WAN is available; and
   receiving, from the terminal, a communication checking signal for requesting to check the availability of the communication to the WAN via satellite by wireless signal, and transmitting without performing communication via the WAN via satellite by wireless signal, only when the communication from the terminal to the WAN is available via satellite by wireless signal, the communicable signal to the terminal in response to the communication checking signal.

12. The satellite communication device of claim 1, wherein one of an IP address and an MAC address of the terminal is associated with an authorization/unauthorization of the communication of the terminal.

* * * * *